(12) United States Patent
Wenning et al.

(10) Patent No.: US 7,834,098 B2
(45) Date of Patent: Nov. 16, 2010

(54) COMPOSITIONS FOR PRODUCING UNIVERSAL PIGMENT PREPARATIONS

(75) Inventors: Andreas Wenning, Nottuln (DE); Dietmar Loest, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 106 days.

(21) Appl. No.: 11/816,874

(22) PCT Filed: Jan. 25, 2006

(86) PCT No.: PCT/EP2006/050436

§ 371 (c)(1),
(2), (4) Date: Aug. 22, 2007

(87) PCT Pub. No.: WO2006/097378

PCT Pub. Date: Sep. 21, 2006

(65) Prior Publication Data

US 2008/0255316 A1    Oct. 16, 2008

(30) Foreign Application Priority Data

Mar. 17, 2005  (DE)  .................. 10 2005 012 315

(51) Int. Cl.
*C08G 65/32* (2006.01)

(52) U.S. Cl. ............... 525/405; 106/31.86; 106/287.24; 106/499; 516/30; 516/920; 525/398; 525/521

(58) Field of Classification Search .............. 525/405, 525/398, 421; 106/31.86, 287.24, 499; 516/30, 516/920
See application file for complete search history.

(56) References Cited

U.S. PATENT DOCUMENTS

| | | | | |
|---|---|---|---|---|
| 5,705,597 A | * | 1/1998 | Ortelt et al. ............... | 528/128 |
| 6,552,091 B1 | * | 4/2003 | Boinowitz et al. ........... | 516/30 |
| 2005/0124716 A1 | * | 6/2005 | Gloeckner et al. .......... | 522/113 |
| 2008/0234427 A1 | * | 9/2008 | Glockner et al. ............ | 524/592 |

FOREIGN PATENT DOCUMENTS

| | | | |
|---|---|---|---|
| DE | 44 04 809 | | 8/1995 |
| DE | 10 2004 005 207.7 | * | 3/2004 |
| EP | 0 378 048 | | 7/1990 |
| EP | 1 078 946 | | 2/2001 |
| EP | 1 529 821 | | 5/2005 |

OTHER PUBLICATIONS

U.S. Appl. No. 11/908,291, filed Sep. 11, 2007, Wenning et al.
U.S. Appl. No. 12/158,800, filed Jun. 23, 2008, Gloeckner et al.
U.S. Appl. No. 12/159,097, filed Jun. 25, 2008, Gloeckner et al.
U.S. Appl. No. 12/159,673, filed Jun. 30, 2008, Gloeckner et al.
U.S. Appl. No. 12/089,538, filed Apr. 8, 2008, Wenning et al.

* cited by examiner

*Primary Examiner*—David Wu
*Assistant Examiner*—Robert Jones, Jr.
(74) *Attorney, Agent, or Firm*—Oblon, Spivak, McClelland, Maier & Neustadt, L.L.P.

(57) ABSTRACT

The invention relates to new compositions having good binder, wetting, and dispersing properties for virtually foam-free aqueous and also solventborne and solvent-free pigment preparations.

14 Claims, No Drawings

COMPOSITIONS FOR PRODUCING UNIVERSAL PIGMENT PREPARATIONS

The invention relates to new compositions having good binder, wetting, and dispersing properties for virtually foam-free aqueous and also solventborne and solvent-free pigment preparations.

For dispersing fillers and pigments in liquid media it is usual to make use of dispersants, in order in this way to reduce the mechanical shearing forces that are needed for effective dispersion of the solids, and at the same time to realize very high filling levels. The dispersants assist the disruption of agglomerates, wet and/or coat, as surface-active compounds, the surface of the particles to be dispersed, and stabilize them against unwanted reagglomeration.

During the preparation of inks and varnishes, wetting agents and dispersants facilitate the incorporation of pigments and fillers, which, as important formulating ingredients, significantly determine the visual appearance and the physicochemical properties of coatings. For optimum utilization, on the one hand, these solids must be dispersed uniformly in coatings and inks, and, on the other hand, the state of dispersion, once attained, must be stabilized. The stabilizing component is in many cases also represented by binder components. Binders of this kind are valuable components of coating materials not least on account of their contribution to more rapid drying and to increasing the hardness of the resultant films.

Of importance for application in universal pigment preparations is firstly a universal compatibility with other binders, such as with the important long-oil alkyd resins, vegetable oils, hydrocarbon resins, acrylate resins, and polyamides, and secondly a universal solubility in organic solvents, such as in the pure aliphatics and white spirits that are frequently employed on environmental and toxicological grounds. Binders of this kind which can be used in pigment preparations and have universal compatibility and solubility are described for example in DE 44 04 809.

Dispersants used for universal pigment preparations, are, in particular, alkylphenol ethoxylates or fatty alcohol alkoxylates, which contribute to steric stabilization of states of pigment dispersion that have been attained. The alkylphenol ethoxylates, though giving very high performance, have come under criticism on ecotoxicological grounds. Their use in detergents and cleaning products is already banned in many countries. Similar strictures can be expected for the paints and coatings industry. Fatty alcohol ethoxylates in many cases fail to achieve the good pigment wetting properties of the alkylphenol ethoxylates, since they lack groups capable of adsorption. The nonadsorbed part of this product group, in particular, also has the undesirable effect of stabilizing the foam in aqueous pigment preparations.

Block-copolymeric polyalkylene oxides are toxicologically unobjectionable, highly adsorptive, but not very stabilizing with regard to foam. They are described for example in EP 1 078 946. Complete breakdown of foam formation, however, is something which these products cannot achieve. Here as well, therefore, active defoaming substances must be added to the aqueous pigment preparations. These substances, however, have other, negative side-effects, such as unwanted surface defects. Many dispersing additives cannot be used because the water resistance or light stability of coatings is adversely affected.

It was an object of the present invention, therefore, to find a composition possessing good binder properties on the one hand and, on the other hand, at the same time, good wetting properties and dispersing properties.

The object on which the invention is based has been surprisingly achieved through the use of a combination of block-copolymeric, styrene oxide-containing polyalkylene oxides and ketone-aldehyde resins.

Surprisingly it has been found that the combination of block-copolymeric, styrene oxide-containing polyalkylene oxides with ketone-aldehyde resins is outstandingly suitable for use as a dispersant not only for solvent-free and solventborne but also for aqueous universal pigment preparations.

A broad compatibility with binders and solubility in organic solvents and water used for universal pigment preparations has been found. Furthermore, foam formation in aqueous pigment preparations is very efficiently suppressed. The properties of coating materials, such as initial drying and hardness, are positively influenced when they contain the composition of the invention. In knowledge of the state of the art it could not have been foreseen that the combination of the individual components would lead to the composition possessing the stated sum of properties.

The invention provides compositions essentially containing

A) 95% to 5% by weight of at least one block-copolymeric, styrene oxide-containing polyalkylene oxide, and
B) 5% to 95% by weight of a ketone-aldehyde resin, and
C) 0 to 80% by weight of at least one solvent, the sum of the amounts by weight of components A) to C) being 100% by weight.

Since not only block-copolymeric, styrene oxide-containing polyalkylene oxides but also ketone-aldehyde resins are insoluble in water, it was completely surprising that a combination of both compounds is soluble in water and allows use in aqueous pigment preparations.

In principle, all block-copolymeric, styrene oxide-containing polyalkylene oxides are suitable as component A).

The block-copolymeric, styrene oxide-containing polyalkylene oxides A) used with preference in the invention are described for example in EP 1 078 946. They possess the general formula I:

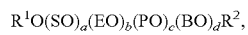

$$R^1O(SO)_a(EO)_b(PO)_c(BO)_dR^2,$$

where $R^1$ is a straight-chain or branched or cycloaliphatic radical having 8 to 13 carbon atoms, $R^2$ is hydrogen or an acryloyl radical, alkyl radical or carboxylic acid radical having in each case 1 to 8 carbon atoms, SO=styrene oxide,
EO=ethylene oxide,
PO=propylene oxide,
BO=butylene oxide and
a=1 to 1.9,
b=3 to 50,
c=0 to 3,
d=0 to 3,
a, c or d being other than 0, and b>=a+c+d.

In principle, all ketone-aldehyde resins are suitable as component B).

The preferred ketone-aldehyde resins B), which are described in DE 44 05 809, are prepared from cycloaliphatic ketones, aldehyde, and, if desired, further monomers.

These ketone-aldehyde resins contain

I. 40 to 100 mol %, based on all ketones employed, of at least one alkyl-substituted cyclohexanone having one or more alkyl radicals having 1 to 8 carbon atoms,
II. 0.8 to 2.0 mol of at least one aliphatic aldehyde, based on 1 mol of all ketones employed, and
III. 0 to 60 mol %, based on all ketones employed, of further ketones having aliphatic, cycloaliphatic, aromatic hydrocarbon radicals, it being possible for these ketones to be identical or different and to be substituted in turn, in the hydrocarbon chain, by the stated hydrocarbon radicals, and also, if desired, phenols and/or urea or its derivatives.

Particularly preferred $C_1$- to $C_8$-alkyl-substituted cyclohexanones are 4-tert-butylcyclohexanone and 3,3,5-trimethylcyclohexanone.

The mixing ratio of the block-copolymeric, styrene oxide-containing polyalkylene oxides to the ketone-aldehyde resins, used in accordance with the invention, is 95:5 to 5:95. If more than 50% by weight of ketone-aldehyde resin is used in this mixture, an auxiliary solvent C) must be used, for viscosity reasons.

Suitable components C) include water and all organic solvents. The organic solvents include, for example, alcohols, esters, ketones, ethers, glycol ethers, aromatic hydrocarbons, hydroaromatic hydrocarbons, halogenated hydrocarbons, terpene hydrocarbons, aliphatic hydrocarbons, ester alcohols, dimethylformamide or dimethyl sulfoxide.

For solventborne pigment preparations preference is given to organic solvents which are environmentally and toxicologically unobjectionable and which are miscible or compatible to a certain degree with water.

For aqueous pigment preparations the mixture of block-copolymeric, styrene oxide-containing polyalkylene oxides A) and ketone-aldehyde resins B) is preferably chosen so that there is no need for an organic solvent as component C).

The invention also provides a process for preparing compositions essentially containing A) 95% to 5% by weight of at least one block-copolymeric, styrene oxide-containing polyalkylene oxide, and
B) 5% to 95% by weight of a ketone-aldehyde resin, and
C) 0 to 80% by weight of at least one solvent, the sum of the amounts by weight of components A) to C) being 100% by weight, by mixing compounds A), B) and C) at temperatures from 20 to 100° C. in a stirred vessel.

The compositions of the invention are used in universal pigment preparations.

In the context of its use, the composition of block-copolymeric, styrene oxide-containing polalkylene oxides and ketone-aldehyde resins can either be mixed beforehand with the pigments that are to be dispersed, or dissolved directly in the aqueous or solvent-containing dispersing medium, prior to or simultaneously with the addition of the pigments.

As pigments it is possible for example to use organic or inorganic pigments and also carbon blacks.

Examples that may be mentioned of inorganic pigments include titanium dioxides and iron oxides.

Examples of suitable organic pigments are azo pigments, metal complex pigments, anthraquinonoid pigments, phthalocyanine pigments, polycyclic pigments, especially those of the thioindigo, quinacridone, dioxazine, pyrrolo, naphthalenetetracarboxylic acid, perylene, isoamidolin(on)e, flavanthrone, pyranthrone or isoviolanthrone series.

As carbon blacks, gas blacks, lamp blacks or furnace blacks can be used. These carbon blacks may additionally have been reoxidized and/or beaded.

Besides pigments, fillers, too, may also be used in the amounts known to a person skilled in the art. Examples of fillers which can be dispersed in aqueous and/or solventborne coating materials are those based on kaolin, talc, mica, other silicates, quartz, cristobalite, wollastonite, perlites, diatomaceous earth, fiber fillers, aluminum hydroxide, barium sulfate or calcium carbonate.

The compositions of the invention are notable for very good adsorptivity to pigments, excellent foam destruction, and a low viscosity. Furthermore, the drying rate, water resistance and chemical resistance, and hardness of coatings are positively influenced.

The following examples are intended to illustrate the invention but not restrict its scope of application:

EXAMPLES

1) Preparation of a Styrene Oxide-containing Polyalkylene Oxide (Not Inventive)

336.4 g (2.34 mol) of trimethylcyclohexanol and 16.3 g (0.23 mol) of potassium methoxide were charged to a reactor. After careful flushing with pure nitrogen, the initial charge was heated to 110° C. and 308.2 g (2.554 mol) of styrene oxide were added over the course of an hour. After a further two hours the addition of the styrene oxide was at an end, as evidenced by a residual styrene oxide content of <0.1% by weight according to gas chromatogram. Subsequently 339.2 g (7.71 mol) of ethylene oxide were metered into the reactor at a rate such that the internal temperature did not exceed 120° C. and the pressure did not exceed 6 bar. Following complete introduction of the ethylene oxide, the temperature was held at 115° C. until a constant manometer pressure indicated the end of the subsequent reaction. Lastly, at 80 to 90° C., the unreacted, residual monomers were removed under reduced pressure. The product obtained was neutralized with the aid of phosphoric acid, and the water was removed by distillation and the potassium phosphate formed by filtration together with a filter aid. The molecular weight from the determination of the hydroxyl number, with an assumed functionality of 1, was M=467 g/mol.

2) Preparation of a Ketone-aldehyde Resin (Not Inventive)

176.7 g of 4-tert-butylcyclohexanone, 481.7 g of 3,3,5-trimethylcyclohexanone, 112.4 g of cyclohexanone and 373.1 g of a 30% strength by weight formalin solution were introduced as an initial charge and heated to 60° C. Thereafter 114.5 g of a 50% strength by weight sodium hydroxide solution were added dropwise over the course of 15 minutes and the mixture was heated to 80° C. Subsequently, over the course of 90 minutes, 200.0 g of the formalin solution were added dropwise and the mixture was held at reflux at 85° C. for 4 hours. The resin formed, following addition of glacial acetic acid, was washed to neutrality with water. Distillation gave a pale yellow, brittle resin having a softening point of 85° C.

3) Preparation of the Inventive Composition 600 g of the styrene oxide-containing polyalkylene oxide from Example 1) and 400 g of the ketone-aldehyde resin from Example 2) were mixed with one another at 80° C. with stirring. The product was clear and had a viscosity at 23° C. of 13 446 mPa s.

4) Preparation of the Inventive Composition with Binder and Dispersing Properties 500 g of the styrene oxide-containing polyalkylene oxide from Example 1) and 500 g of the ketone-aldehyde resin from Example 2 were mixed with one another at 80° C. with stirring. The product was clear and had a viscosity at 23° C. of 88 810 mPa s.

To test the effectiveness of the inventive composition as a dispersing additive with binder properties, and also that of the comparative compounds, the following procedure was adopted:

5) Preparation of the Pigment Preparations

For this purpose the respective additives were mixed with water and/or organic solvent and then the pigments were added. Dispersing took place, following the addition of 2 mm glass beads, in a Dispermat at 3000 rpm at 35° C. for 30 minutes. The aqueous pigment preparations were adjusted to a pH of approximately 9 using a mixture of dimethylaminoethanol and water (1:1% by weight).

5A) Formulation of an Aqueous, Black Pigment Preparation (Inventive)

62.9 g water
8.0 g inventive composition from Example 3)
20.0 g Spezialschwarz 4 (Degussa AG)

This black pigment preparation was readily stirrable and foam-free.

5B) Formulation of an Aqueous, Black Pigment Preparation (Comparative)

70.9 g water
8.0 g noninventive compound from Example 1)
20.0 g Spezialschwarz 4 (Degussa AG)

This black pigment preparation was highly viscous and exhibited severe foaming.

5C) Formulation of a Solventborne, Black Pigment Preparation (Inventive)

75.0 g butylglycol
25.0 g inventive composition from Example 4)
20.0 g Spezialschwarz 4 (Degussa AG)

This black pigment preparation was of low viscosity.

5D) Formulation of an Aqueous, Blue Pigment Preparation (Inventive)

80.0 g water
20.0 g inventive composition from Example 3)
48.0 g Heliogenblau 6975F (BASF AG)

This blue pigment preparation, which had a viscosity of 58 mPa s, was readily stirrable and foam-free. It was also of unchanged stability after storage at 50° C. for more than one week.

5E) Formulation of an Aqueous, Blue Pigment Preparation (Comparative)

80.0 g water
20.0 g noninventive compound from Example 1)
48.0 g Heliogenblau 6975F (BASF AG)

This blue pigment preparation was highly viscous and exhibited severe foaming.

6) Preparation of Coating Materials from the Pigment Preparations

To prepare coating materials, the pigment preparations were introduced and the letdown compounds were added in portions.

6A) Preparation of Solvent-Free, Black Coating Materials

The inventive and the noninventive pigment preparations were let down with an aqueous polyurethane dispersion.

|  | inventive | comparative |
|---|---|---|
|  | Black pigment preparation | |
|  | 8.4 g from Example 5A) | 8.4 g from Example 5B) |
| Alberdingk U 800 (Alberdingk Boley GmbH) | 63.0 g | 63.0 g |
| Drying: 1 h at 60° C., drawdown onto glass plate using 100 μm drawing frame | | |
| Gloss 20° | 74 | 74 |
| Gloss 60° | 84 | 84 |
| Haze gloss | 20 | 18 |
| Pendulum hardness | 86 | 87 |

6B) Preparation of Solventborne and Low-solvent, Black Coating Materials

The solventborne black pigment preparation of the invention was let down both as a solventborne system and as an aqueous system.

|  | Black pigment preparation | |
|---|---|---|
|  | 6.8 g from Example 5C) | 7.0 g from Example 5C) |
| Degalan 706 (Röhm GmbH) | 50.0 g | 63.0 g |
| Dynapol HW 112-56 (Degussa AG) | — | 55.5 g |
| Cymel 325 (Cytech) | — | 3.7 g |
| Demineralized water | — | 10.0 g |
| Tego 7442, 10% in water (Tego Chemie Service GmbH) | — | 0.8 g |
| Drawdown onto glass plate using 100 μm drawing frame | Drying: 24 h at 25° C. | Drying: 20 min at 140° C. |
| Gloss 20° | 73 | 92 |
| Gloss 60° | 84 | 98 |
| Haze gloss | 26 | 70-76 |
| Pendulum hardness | 141 | 175 |

7) Preparation of Tinted Paints

To prepare tinted varnishes the blue pigment preparation was mixed with a white paint.

The white paint consisted of 70.69 g of Alberdingk U 800 (Alberdingk Boley GmbH), 28.24 g of Kronos 2310 (Kronos Titan GmbH) and 0.07 g of Aerosil 200 (Degussa AG).

|  | inventive | comparative |
|---|---|---|
| White paint | 99.0 g | 99.0 g |
| Blue pigment preparation | 3.7 g from Example 5D) | 3.7 g from Example 5E) |
| Demineralized water | 6.5 g | 6.5 g |

The binder/white pigment ratio was 1:1 and the ratio of blue pigment to white paint 1:100.

The tinted paints drawn down, using a 100 μm drawing frame, were dried for 2 minutes and then subjected to rub-out testing. Additionally the color strength was measured.

|  | Color strength F | Delta E after rub-out |
|---|---|---|
| inventive | 31 | 0.32 |
| comparative | 29 | 0.35 |

The tinted paint based on the inventive composition dried substantially more quickly than the comparative tinted paint.

Solventborne, low-solvent, and solvent-free pigment preparations and coating materials can be prepared using the compositions of the invention. In contrast to the comparative examples, the aqueous pigment preparations are of low viscosity and virtually foam-free.

Furthermore, the development of color strength and the flocculation resistance of pigment preparations, and also the initial drying of coatings, were positively influenced.

What is claimed is:

1. A composition, comprising:
   A) 95% to 5% by weight of at least one block-copolymeric, styrene oxide-containing polyalkylene oxide,
   B) 5% to 95% by weight of a ketone-aldehyde resin, and
   C) 0 to 80% by weight of at least one solvent,
   wherein the sum of the amounts by weight of components A) to C) is 100% by weight.

2. The composition as claimed in claim 1, wherein the block-copolymeric, styrene oxide-containing polyalkylene oxides A) possess the general formula I:

$R^1O(SO)_a(EO)_b(PO)_c(BO)_dR^2$, wherein
   $R^1$ is a straight-chain or branched or cycloaliphatic radical having 8 to 13 carbon atoms,
   $R^2$ is hydrogen or an acryloyl radical, alkyl radical or carboxylic acid radical having in each case 1 to 8 carbon atoms,
   SO=styrene oxide,
   EO=ethylene oxide,
   PO=propylene oxide,
   BO=butylene oxide and
   a=1 to 1.9,
   b=3 to 50,
   c=0 to 3,
   d=0 to 3,
   a, c or d being other than 0, and b >=a+c+d.

3. The composition as claimed in claim 1, wherein the ketone-aldehyde resins B) comprises:
   I. 40 to 100 mol %, based on all ketones employed, of at least one alkyl-substituted cyclohexanone having one or more alkyl radicals having 1 to 8 carbon atoms,
   II. 0.8 to 2.0 mol of at least one aliphatic aldehyde, based on 1 mol of all ketones employed, and
   III. 0 to 60 mol %, based on all ketones employed, of further ketones having aliphatic, cycloaliphatic, aromatic hydrocarbon radicals, it being possible for said ketones to be identical or different and to be substituted in the hydrocarbon chain, by said hydrocarbon radicals, and also, optionally phenols and/or urea or its derivatives.

4. The composition as claimed in claim 1, wherein
   a mixing ratio of the block-copolymeric, styrene oxide-containing polyalkylene oxides A) to the ketone-aldehyde resins B) is 95:5 to 5:95.

5. The composition as claimed in claim 1, wherein water is present as solvent C).

6. The composition as claimed in claim 1, wherein an organic solvent is present as solvent C).

7. The composition as claimed in claim 1, wherein solvent C) is at least one member selected from the group consisting of alcohol, ester, ketone, ether, glycol ether, aromatic hydrocarbon, hydroaromatic hydrocarbon, halogenated hydrocarbon, terpene hydrocarbon, aliphatic hydrocarbon, ester alcohol, dimethylformamide, dimethyl sulfoxide and mixtures thereof.

8. A process for preparing a composition, comprising:
   mixing compounds A), B) and C), at temperatures from 20° to 100° C. in a stirred vessel, to obtain a composition which comprises:
   A) 95% to 5% by weight of at least one block-copolymeric, styrene oxide-containing polyalkylene oxide,
   B) 5% to 95% by weight of a ketone-aldehyde resin, and
   C) 0 to 80% by weight of at least one solvent, and
   the sum of the amounts by weight of components A) to C) is 100% by mixing compounds A), B), and C), at temperatures from 20 to 100° C. in a stirred vessel.

9. The process as claimed in claim 8, wherein the block-copolymeric, styrene oxide-containing polyalkylene oxides A) possess the general formula I:

$R^1O(SO)_a(EO)_b(PO)_c(BO)_dR^2$, wherein
   $R^1$ is a straight-chain or branched or cycloaliphatic radical having 8 to 13 carbon atoms,
   $R^2$ is hydrogen or an acryloyl radical, alkyl radical or carboxylic acid radical having in each case 1 to 8 carbon atoms,
   SO=styrene oxide,
   EO=ethylene oxide,
   PO=propylene oxide,
   BO=butylene oxide and
   a=1 to 1.9,
   b=3 to 50,
   c=0 to 3,
   d=0 to 3,
   a, c or d being other than 0, and b >=a+c+d.

10. The process as claimed in claim 8, wherein the ketone-aldehyde resins B) comprises:
    I. 40 to 100 mol %, based on all ketones employed, of at least one alkyl-substituted cyclohexanone having one or more alkyl radicals having 1 to 8 carbon atoms,
    II. 0.8 to 2.0 mol of at least one aliphatic aldehyde, based on 1 mol of all ketones employed, and
    III. 0 to 60 mol %, based on all ketones employed, of further ketones having aliphatic, cycloaliphatic, aromatic hydrocarbon radicals, it being possible for said ketones to be identical or different and to be substituted in the hydrocarbon chain, by said hydrocarbon radicals, and also, optionally, phenols and/or urea or its derivatives.

11. The process as claimed in claim 8, wherein
    a mixing ratio of the block-copolymeric, styrene oxide-containing polyalkylene oxides A) to the ketone-aldehyde resins B) is 95:5 to 5:95.

12. The process as claimed in claim 8, wherein water is present as solvent C).

13. The process as claimed in claim 8, wherein an organic solvent is present as solvent C).

14. The process as claimed in claim 8, wherein solvent C) is at least one member selected from the group consisting of alcohol, ester, ketone, ether, glycol ether, aromatic hydrocarbon, hydroaromatic hydrocarbon, halogenated hydrocarbon, terpene hydrocarbon, aliphatic hydrocarbon, ester alcohol, dimethylformamide, dimethyl sulfoxide and mixtures thereof.

* * * * *